(12) United States Patent
Nezu et al.

(10) Patent No.: US 10,927,901 B2
(45) Date of Patent: Feb. 23, 2021

(54) WET MULTI-PLATE CLUTCH

(71) Applicant: UNIPRES CORPORATION, Yokohama (JP)

(72) Inventors: Hideyuki Nezu, Fuji (JP); Ryosuke Suzuki, Fuji (JP); Kazuhiro Ohta, Fuji (JP)

(73) Assignee: UNIPRES CORPORATION, Yokohama (JP)

( * ) Notice: Subject to any disclaimer, the term of this patent is extended or adjusted under 35 U.S.C. 154(b) by 63 days.

(21) Appl. No.: 16/240,520

(22) Filed: Jan. 4, 2019

(65) Prior Publication Data

US 2019/0136915 A1     May 9, 2019

Related U.S. Application Data

(63) Continuation of application No. PCT/JP2017/021044, filed on Jun. 7, 2017.

(30) Foreign Application Priority Data

Jul. 7, 2016 (JP) .............................. JP2016-134913

(51) Int. Cl.
*F16D 25/0638* (2006.01)
*F16D 25/12* (2006.01)
(Continued)

(52) U.S. Cl.
CPC ....... *F16D 25/0638* (2013.01); *F16D 25/123* (2013.01); *F16D 25/14* (2013.01); *F16D 13/583* (2013.01); *F16D 2121/04* (2013.01)

(58) Field of Classification Search
CPC ... F16D 25/0638; F16D 13/583; F16D 13/585
See application file for complete search history.

(56) References Cited

U.S. PATENT DOCUMENTS 3,190,421 A * 6/1965 Schulz ................ F16D 25/0638
                                                192/85.34
3,236,349 A * 2/1966 Wiggins .............. F16D 25/0638
                                                192/99 A
(Continued)

FOREIGN PATENT DOCUMENTS

EP        0 335 687 B1    9/1992
JP        S56-164228 A   12/1981
(Continued)

*Primary Examiner* — Ernesto A Suarez
*Assistant Examiner* — James J Taylor, II
(74) *Attorney, Agent, or Firm* — Foley & Lardner LLP

(57) ABSTRACT

A wet-type multi plate clutch having a obtaining hydraulic chamber, which is capable of increasing a fuel consumption efficiency by reducing a load of an oil pump for clutch oil for engaging the clutch and which realizes a simplified structure by eliminating a necessity of a canceller chamber.
A disk spring 46 is, at its outer peripheral part, is supported by a clutch drum 10 and contacts, at its inner peripheral part, with a spring presser part 12-1 of the piston 12. The disk spring 46 faces, at the side opposite the piston 12, with clutch pack 20. A forward movement of the piston 12 by operating pressure in a hydraulic chamber is transmitted to the clutch pack 20 via the disk spring 46, resulting in an engaged condition of the clutch pack 20. A driving force of the piston 12 by the hydraulic oil pressure is boosted under a lever ratio a/b of the disk spring 46 and is transmitted to the clutch pack 20. The disk spring 46 to the spring presser part 12-1 without obstructing the slide movement of the piston 12 of obtaining an increased radial length of the spring, resulting in an increased return force of the spring 46 for a positive reverse movement of the piston 12 for obtaining a disengaged condition of the clutch.

5 Claims, 6 Drawing Sheets

(51) Int. Cl.
*F16D 121/04* (2012.01)
*F16D 13/58* (2006.01)
*F16D 48/02* (2006.01)

(56) References Cited

U.S. PATENT DOCUMENTS

| | | | | |
|---|---|---|---|---|
| 3,266,608 | A | * | 8/1966 | Lemieux ............ F16D 25/0638 |
| | | | | 192/85.34 |
| 3,307,430 | A | * | 3/1967 | Bauder ............... F16H 63/3026 |
| | | | | 475/146 |
| 4,623,055 | A | | 11/1986 | Ohkubo |
| 5,103,953 | A | * | 4/1992 | Nakayama .......... F16D 25/0638 |
| | | | | 192/85.35 |
| 5,879,260 | A | | 3/1999 | Yoshida et al. |
| 6,468,177 | B2 | | 10/2002 | Park |
| 7,392,890 | B2 | | 7/2008 | Agner |
| 9,624,986 | B2 | | 4/2017 | Nakano et al. |

FOREIGN PATENT DOCUMENTS

| JP | S60-086627 U | 6/1985 |
|---|---|---|
| JP | H01-247827 A | 10/1989 |
| JP | 2002-106598 A | 4/2002 |
| JP | 2016-011746 A | 1/2016 |

\* cited by examiner

WET MULTI-PLATE CLUTCH

CROSS-REFERENCE TO RELATED APPLICATIONS

This application is a continuation of International Application No. PCT/JP2017/021044, filed Jun. 7, 2017, and claims priority to Japanese Patent Application No. 2016-134913 filed Jul. 7, 2016, the entire contents of which are incorporated herein by reference.

TECHNICAL FIELD

The present invention relates to a wet-type multi plate clutch for transmitting driving power in an automatic transmission of an automobile et al and, in particular, to a wet-type multi plate clutch including a clutch drum and a piston, which cooperate with each other to form a type of a hydraulic chamber, which effects a rotating movement.

BACKGROUND TECHNOLOGY

In a vehicle provided with a continuous variable transmission (CVT), a wet-type multi plate clutch is known, which is used in a forward-reverse switching device et al. The wet-type multi plate clutch is provided with a piston for operating the clutch, which piston effects a rotating movement. The piston is arranged in a clutch drum, which is filled with clutch oil (CVT oil) functioning also for a lubrication of parts inside the CVT. The piston rotates together with the clutch drum and functions to operate a clutch pack. A hydraulic chamber is formed on one side of the piston in a manner that the hydraulic chamber is kept to be under a liquid tight condition with respect to the clutch oil. By an axial movement of the piston under a hydraulic pressure in the hydraulic chamber, engagements occur between clutch plates on a clutch drum and clutch plates on a clutch hub via clutch facings, constructing a clutch pack, so that an engaged condition of the clutch is obtained where the clutch drum is connected with the clutch hub. In order to release the clutch for obtaining a disengaged condition of the clutch, a control of pressure of hydraulic oil in the hydraulic chamber is done so that a reduction of hydraulic pressure in the hydraulic chamber is obtained. A provision of return means is made, which is usually constructed by a plurality of coil springs arranged in a spaced manner in a circumferential direction. A setting of the return springs is such that the set force is smaller than a force in the piston for causing the piston to move in a direction for obtaining the engaged condition of the clutch by a hydraulic pressure in the hydraulic chamber and such that the set force is larger than a hydraulic pressure in the hydraulic chamber in a disengaged condition of the clutch in order to allow the piston to be moved in the opposite direction.

In a conventional type of a wet-type multi plate clutch, a provision of so-called canceller chamber is usual. See Patent Document 1. Namely, the conventional coil-springs as the returning means cannot generate desirably large returning force. Therefore, a centrifugal pressure of the hydraulic oil remaining in the hydraulic chamber as generated by the rotating movement of the piston, i.e., the rotating movement of the hydraulic chamber, opposes to the returning movement of the piston by the return springs, which may prevent the clutch to be completely separated, which may cause the clutch plates to be rapidly worn under a slippage of the clutch plates at a high rotating speed. Therefore, a need of the provision of a canceller chamber is arisen, which is located on the side of the piston opposite the hydraulic chamber and which operates also for storing therein with the coil springs. The clutch oil functioning also as CVT oil filled in the clutch drum is able to flow into the canceller chamber. The centrifugal force generated by the rotating movement of the clutch drum causes the clutch oil to be held in the canceller chamber. The clutch oil thus held in the canceller chamber generates a pressure as induced under the centrifugal force. This centrifugal pressure in the clutch oil functions to cross out the centrifugal oil pressure generated in the hydraulic chamber on the side of the piston opposite the canceller chamber. Thanks to such a canceling function, a positive return movement of the pistons by the return springs is obtained.

Apart from the above, a structure has also been proposed wherein a disk spring functioning as return spring means is used. See Patent Document 2. The disk spring is arranged on the side of the piston away from the hydraulic chamber and has an inner or outer peripheral part located opposite to the piston and an outer or inner peripheral part located opposite to a fixed part of the clutch drum. A forward movement of the piston under the increase in the pressure at the hydraulic chamber causes the disk spring to be subjected to a deformation, resulting in a generation of a resilient force for a reverse movement of the piston upon the removal of the hydraulic pressure. Even in the use of the disk spring, a rotating movement of the hydraulic chamber causes a centrifugal pressure to be generated by the hydraulic oil remaining in the hydraulic chamber, which centrifugal pressure opposes to the return movement of the piston by the spring force, which necessitates a provision of a canceller chamber on a side of the disk spring opposite the piston. Namely, the clutch oil stored in the canceller chamber generates a pressure for crossing out the centrifugal pressure generated in the hydraulic chamber, so that a positive return movement of the piston by the disk spring is obtained.

As a further prior art of a wet-type multi plate clutch for a power transmission between a clutch drum and a clutch hub, using a disk spring for obtaining a piston returning movement, a construction has also already been proposed, wherein pistons of non-rotating type are used. See Patent Document 3. In this prior art, a plurality of circumferentially spaced slave pistons is arranged adjacent a rotating axis. The slave pistons are arranged so as to oppose a disk spring by way of a ball bearing unit in a manner that the slave pistons are simultaneously moved by hydraulic pressure by a master piston. In this structure of the Patent Document 3, any centrifugal oil pressure does not occur, which makes any canceller chamber to be unnecessary. This Patent Document 3 also proposes to provide a booster mechanism under the lever ratio principle for the disk spring.

The present invention is applicable to a forward-reverse device in a planetary gear type transmission for a vehicle provided with a belt type continuous variable transmission. See Patent Documents 4 and 5.

PRIOR ART DOCUMENTS

Patent Documents

Patent Document 1: JP2016-11746
Patent Document 2: JP4638590
Patent Document 3: JP2006-10077
Patent Document 4: JP2013-249871
Patent Document 5: JPH09-310745

SUMMARY OF THE INVENTION

Problem to be Solved

An oil pump driven by the engine is employed for supplying the hydraulic oil to the hydraulic chamber. The oil pump is needed to have a capacity for generating an output pressure that can provide a pressure in the hydraulic chamber, which can afford a vehicle operating torque. The oil pump therefore occupies non-negligible large part in the engine power, resulting in worsened fuel consumption efficiency. This, in particular, makes a vehicle employed a continuous transmission of a belt type et al to be disadvantageous in its reduced fuel consumption efficiency because of an increased part of the power consumed by the oil pump due to a fact that the forward clutch is kept to be under an engaged condition.

Furthermore, a provision of a canceller chamber may generate a centrifugal oil pressure under the existence of a centrifugal force, which necessitates a partition member and seal members for obtaining a sealed structure of the clutch oil. In particular, in case where coil springs are employed as for the return spring means, retainers for each of the plurality of circumferentially spaced coil springs are needed at the respective front and rear ends thereof, resulting in a highly increased total part number.

The present invention aims to solve above-mentioned problems encountered in the prior arts and to provide a wet-type multi plate clutch, capable of increasing fuel consumption efficiency by a reduction of a capacity of a clutch oil pump for a clutch engagement operation and capable of obtaining a simplified structure by an eliminating any need of canceller chamber.

Means for Solving Problems

According to the present invention, a wet-type multi plated clutch comprises:

a support body defining therein with a hydraulic passageway; an outer rotating member having an outer tubular part, an inner tubular part and a side wall part, from which side wall part the outer tubular part and the inner tubular part extend axially, the outer rotating member forming therein with a space for storing clutch oil, said inner tubular part being rotatable with respect to the support body;

an inner rotating member arranged rotatably inside of and coaxially with the outer rotating member;

a clutch pack having a plurality of first clutch plates fixed in rotation and axially slidable with respect to the outer rotating member, a plurality of second clutch plates fixed in rotation and axially slidable with respect to the inner rotating member, the first and second clutch plates being axially alternately arranged and clutch facings, each of which is fixed to one of axially opposed surfaces of the first and second clutch plates, which are axially located adjacent with each other, said clutch pack being capable of selectively switched between an engaged condition where a power transmission occurs between the first and the second clutch plates via the clutch facings when being pressed from axially opposed sides and a disengaged condition where a power transmission between the first and the second clutch plates does not occur when not being pressed from axially opposed sides;

a clutch pack positioning member arranged in the outer tubular part of the outer rotating member, the clutch pack positioning member defining a position of the clutch pack on one side thereof in the axial direction;

a pressure receive member arranged on the side of the clutch pack opposite the clutch pack positioning member;

a piston arranged inside the outer rotating member coaxial therewith, the piston being moved between a reverse position and a forward position;

a hydraulic chamber formed on one side of the piston in a manner that a liquid tight condition with respect to clutch oil is obtained, a supply of hydraulic oil into the hydraulic chamber via the hydraulic passageway causing the piston to be forwardly moved, a removal of the hydraulic oil via the hydraulic passageway causing the piston to be reversely moved;

a disk spring formed as an annular resilient plate, which, in the radial direction, extends at its outer peripheral part toward the outer tubular part of the outer rotating member and extends at its inner peripheral part toward the inner tubular part of the outer rotating member and which, in the axial direction, faces at its inner peripheral side with the piston and faces at its outer peripheral side with the pressure receive member, the disk spring having elasticity for urging the piston to move reversely when the pressure inside the hydraulic chamber is low so that the piston is spaced from the pressure receive member causing the clutch pack to take the disengaged condition, the piston being moved in the forward direction against the force of the elasticity of the disk spring for pressing the clutch pack by the pressure receive member to cause the clutch pack to take the engaged condition, and;

a disk spring support member for axially supporting non-movably or substantially non-movably the disk spring with respect to the outer rotating member at a predetermined radial location of the disk spring during the forward movement of the piston for obtaining the engaged condition of the clutch pack; a point of the contact of the disk spring with respect to the disk spring support member being determined with respect to the contact point of the disk spring with the piston and the contact point the disk spring with the pressure receive member in a manner that the pressure force generated in the piston by the hydraulic pressure in the hydraulic chamber is transmitted to the pressure receive member while being boosted under a leverage action.

An arrangement is possible that the position of the contact of the disk spring with respect to the pressure receive member is, via the disk spring, arranged axially opposite the contact position of the disk spring with the piston and that the disk spring support member is located adjacent the inner surface of the outer tubular part of the outer rotating member. In this case, an arrangement is possible that the outer rotating member is, at its sidewall part, provided with a tubular extended part for storing therein with the piston in a manner that the hydraulic chamber is formed.

Another arrangement is also possible that the contact position of the disk spring with respect to the pressure receive member and the contact position of the disk spring with respect to the piston are, via the disk spring, arranged axially opposite the spring disk spring support member and that the disk spring support member is constructed as an annular projection formed in the side wall of the outer rotating member. In this arrangement, the piston is arranged radially inside of the inner rotating member and a provision is made as to an annular support member, which is, at its outer peripheral part, slidable with respect to the piston and is arrange on the inner tubular part of the outer rotating member, the hydraulic chamber being formed by the piston and the annular support member.

Advantageous Effects of the Invention

A power boost operation under the leverage action allows the piston to displace against the disk spring by a relatively low hydraulic pressure in the hydraulic chamber to obtain the engaged condition of the clutch. As a result, a reduction is obtained in a power consumed by the engine for operating the pump for feeding the oil to the hydraulic chamber, resulting in an increase in fuel consumption efficiency.

Furthermore, thanks to the construction of the disk spring contacting, along its radial direction, with the support member, the pressure receive member and the piston, respectively, a maximum effective length of the disk spring in a radially limited spacing inside the outer rotating member is obtained, so that increased spring force is obtained in the disk spring at the full stroke condition of the piston, which spring force is large enough for the piston to overcome the centrifugal oil pressure in the hydraulic chamber, resulting in a positive return movement of the piston to its retracted position as designated, which prevents the piston from being prematurely worn. Thus, the present invention makes it possible that a necessity of a provision of any canceller chamber is eliminated, which otherwise essentially needed in a conventional wet-type of multi plate clutch of a type where the piston effects a rotating movement. Furthermore, a reduction in a production cost is obtained due to a reduction in the total number of constituent parts.

In short, thanks to the structure of the present invention where a disk spring as return spring means is used, an improvement in fuel consumption efficiency as well as a simplified structure are simultaneously attained.

BRIEF EXPLANATION OF ATTACHED DRAWINGS

FORMS FOR PRACTICING THE INVENTION

Figure 1:
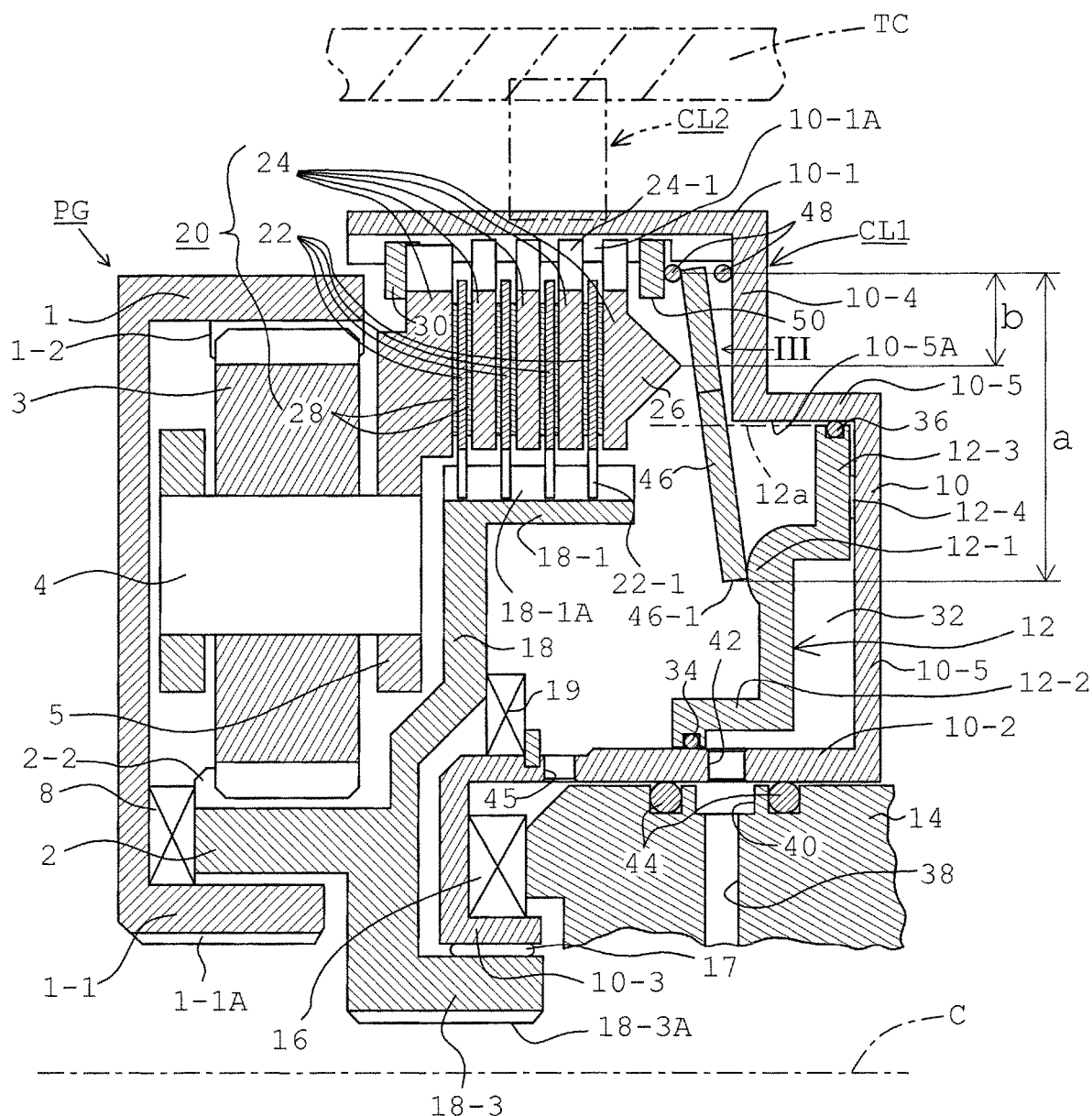
FIG. 1 is a cross sectional view of a wet-type multi plate clutch in a first embodiment of the present invention when the clutch is under a disengaged condition, the clutch being shown only at a side thereof along the central axis.

In FIG. 1 illustrates a first embodiment of the present invention, a wet-type multi plate clutch is shown, which is, non-limitlessly, intended to be incorporated to a forward-reverse mechanism interposed, in a vehicle transmission, between an internal combustion engine and a continuous variable transmission (CVT). See the Patent Documents 4 and 5. In FIG. 1, the forward-reverse mechanism is shown as a sectional view along a radial plane only at a side with respect to a central axis C, i.e., the opposite side with respect to the centerline is not shown in the FIG. 1. The forward-reverse mechanism is stored in a transmission casing TC which is shown partially by phantom lines and, in this embodiment, is provided with a planetary gear mechanism PG and two clutch sections CL1 and CL2. The transmission case TC stores therein with lubricant oil (below, CVT oil) subjected to positive re-circulated flow. The CVT oil serves to lubricate not only for the planetary gear mechanism PG and the clutches CL1 and CL2 and but also for other not shown pats of the transmission. The CVT oil also serves to cool clutch plates in the clutches CL1 and CL2. Namely, the CVT oil in this embodiment corresponds to clutch oil in a wet-type multi plate clutch in this embodiment in the present invention. First, the planetary gear mechanism PG includes three rotating elements, which are a ring gear 1, a sun gear 2 and a carrier 5. The carrier 5 supports, by respective pins 4, rotatably a plurality of equiangularly spaced pinions 3, only one of which pinions is shown in the FIG. 1. In the shown embodiment, the carrier 5 forms an integral part functioning a driven plate (24) in the clutch pack 20, which locates the most adjacent the carrier 5, as will be explained later. Furthermore, the sun gear 2 is formed with a part, functioning as a clutch hub 18 of the clutch CL1 as also will be explained later. The ring gear 1 forms a tubular shape having, at its axial center, a boss portion 1-1, which forms a spline hole 1-1A meshing with an output shaft (not shown) to the continuous variable transmission. As similar to a construction of a usual type of a planetary gear device, each pinion has teeth 3-1, which meshes, at its outer parts, with teeth 1-2 of the sun gear 1 and which meshes, at its inner part, with the teeth 2-2 of the sun gear 2. Furthermore, as described later, a forward movement of the vehicle is obtained in an engaged condition of the clutch CL1 and a disengaged condition of the clutch CL2. Contrary to this, a reverse movement of the vehicle obtained in a disengaged condition of the clutch CL1 and an engaged condition of the clutch CL2. Finally, a thrust bearing 8 is arranged in an axial gap formed between opposed surfaces of the ring gear 1 and the sun gear 2.

Now, referring the constructions of the clutches, the clutch CL1 is for a forward movement and the clutch CL2 is for a reverse movement. The reverse movement clutch CL2 is only schematically illustrated. A construction of the forward movement clutch CL1 will now be explained. A reference numeral 10 denotes a clutch drum (an outer rotating member in the present invention), which includes an outer tubular part 10-1, an inner tubular part 10-2, a boss part 10-3 for supporting the clutch hub and a side wall part 10-4 for obtaining a closed structure of the clutch drum 10 on its one side along the axial direction. The side wall part 10-4 forms, at its radially inward location, an axially extended part 10-5. Inside the part 10-5, an annular piston bore 10-5A is formed and an annular piston 12 is stored in the piston bore 10-5 in a manner that the annular piston 12 slides axially. The inner tubular part 10-2 of the clutch drum 10 is rotatably supported on a clutch drum support body 14 (a support member of the present invention) of a shape of a solid cylindrical body. The clutch drum support body 14 is a fixed part in the transmission and forms therein with inner passageways for an introduction or removal of hydraulic pressure oil as will be explained later. A thrust bearing 16 is arranged for receiving a thrust force applied to the clutch drum 10.

A clutch hub 18 (an inner rotating member of the present invention) has an outer tubular part 18-1 and an inner boss part 18-3. A needle bearing 17 is provided for supporting the inner boss part 18-3 of the clutch hub 18 to the boss part 10-3 of the clutch drum 10. The inner boss part 18-3 of the clutch hub 18 forms at its inner peripheral surface splines 18-3A, with which meshes a not shown rotating shaft from the engine for receiving rotating drive force from the engine. The clutch hub 18 is formed with a tubular part functioning as the sun gear 2 in the planetary gear device PG at a location between the outer tubular part 18-1 and the boss portion 18-3. A thrust bearing 19 is arranged between the clutch drum 10 and the clutch hub 18.

A clutch pack 20 has annular drive plates 22 (second clutch plates in the present invention) and annular driven plates 24 (first clutch plates in the present invention) and the annular drive plates 22 and the annular driven plates 24 are arranged alternately in the axial direction. In the clutch pack 20, the driven plate 24 most spaced from the piston 12 is formed with an integrally radially extended part, which becomes the carrier 5 of the planetary gear mechanism PG. In addition, in the clutch pack 20, the driven plate 24 most adjacent the piston 12 is formed integrally with an axially extended annular part of a cross sectional shape projected in a direction toward the piston. This annular axially projected part becomes as a pressure receive part 26 (pressure receive member of the present invention), which functions to receive a pressing force from the piston 12 during the clutch engaged condition. In this embodiment of the present invention, the driven plate the most adjacent the piston is formed also as the pressure receive part 26. However, the pressure receive part 26 may construct as a separate member. Due to the angled cross-sectional shape of the pressure receive part 26, the pressing force applied to the pressure receive part 26 via a disk spring 46 as will be described later causes the clutch pack 20 to be evenly engaged along the circumferential direction. Each of the drive plates 22 has opposed side surfaces, on which surfaces clutch facings 28 are fixedly formed, which clutch facings 28 are made from frictional materials such as glass fibers and resins. The drive plate 22 is, at its inner peripheral surface, formed with equiangularly spaced projected portions 22-1, which engage axially slidably with respective equiangularly spaced grooves 18-1A, which are formed on an outer peripheral surface of the clutch hub 18. Thanks to this structure, the drive plate 22 is axially slidable with respect to the clutch hub 18 and is rotating integrally together with the clutch hub 18. The driven plate 24 has, at its outer peripheral end, equiangularly spaced projected portions 24-1, which mesh with grooves 10-1A, each extending axially and formed on the inner peripheral surface of the outer tubular part 10-1 of the clutch drum 10. Thanks to this meshing structure, the driven plates 24 are axially slidably moved and are connected integrally to the clutch drum 10 in a direction of the rotating movement. An annular stopper 30 (positioning member of the clutch pack in the present invention) is attached to the inner surface of the outer tubular part 10-1 of the clutch drum 10 and the stopper 30 is located adjacent the driven plate 24 in the clutch pack 20, which is the most spaced from the piston 12. The stopper 30 serves to define an axial position of the driven plate 24, which is the most spaced from the piston 12, when the piston 12 moves or extends forwardly, so that an engaged condition of the clutch pack 20 is obtained. In the clutch pack 20 of this embodiment of the present invention, the attached structure of the clutch facings 28 to opposed or both sides of the each of the drive plates 22 provides an arrangement of the clutch facings 28 between the drive plates 22 and the driven plates 24 axially adjacent with each other, called as a double-side attached arrangement. However, a modified arrangement can also be taken where a clutch facing on a single side not only of each of the drive plates 22 but also of each of a single side of the driven plates 24 in a manner that the clutch facings 28 are located between the drive plates 22 and the driven plates 24 axially adjacent with each other called as a single-side attached arrangement. Finally, FIG. 1 illustrates a non-engaged condition of the clutch pack 20 where small gaps, although not shown in FIG. 1, surely exist between the clutch facings 28 on the surfaces of the drive plates and the opposite surfaces of the driven plates 24.

The piston 12 forms, at a radial intermediate portion thereof, an annular stepped part of inverse-L like cross sectional shape. At a side of the stepped part remote from the clutch drum 10, a disk spring pressing part 12-1 is provided, which is of an annular projected part of a semi spherical cross sectional shape directed toward the inner space of the clutch drum. The piston 12 forms, at a bottom of the inverse-L like cross sectional shape, a central tubular pat 12-2, which is located adjacent the inner tubular part 10-2 of the clutch drum 10, so that the piston 12 is axially slidable with respect to the inner tubular part 10-2 of the clutch drum 10. Furthermore, the piston 12 is, at an outer peripheral part of a front wall part 12-3 in the inverse-L like cross sectional shape, axially slidably fitted to an inner surface (piston bore 10-5A) of an axial extended pat 10-5 of the clutch drum 10. An annular hydraulic chamber is formed between the opposed faces of the piston 12 and the clutch drum 10, i.e., on the side surface of the piston 12 remote from the clutch pack 20. Seal rings 34 and 36 are arranged on the inner and the outer slide surfaces of the piston 12 in a manner that a liquid tightness of the hydraulic chamber with respect to the CVT oil (clutch oil) inside the clutch drum 10. For an introduction of the hydraulic oil to hydraulic chamber 32, the clutch drum support body 14 forms a hydraulic passageway 38 connectable to an outlet port of a not shown hydraulic oil pump via switching valve system also not shown. The hydraulic passageway 38 opens to an annular groove 40 at the outer peripheral surface of clutch drum support body 14. In addition, the inner tubular part 10-2 of the clutch drum 10 forms circumferentially equiangularly spaced oil feed holes 42, each of which is, at its one end, opened to the hydraulic chamber and is, at its other end, opened to the annular groove 40. As a result, regardless the rotating movement of the clutch drum 10, the hydraulic chamber 32 is in communication with the hydraulic passageway 38 byway of the feed holes 42 of hydraulic oil (piston oil) and the annular groove 40, so that an introduction of the hydraulic oil from the oil pump as well as a discharge of the hydraulic oil from the hydraulic passageway 38 become possible. Seal rings 44 are arranged on both sides of the annular groove 40, so that a liquid tight arrangement is obtained between the clutch drum 10 and the clutch drum support body 14. Furthermore, the inner tubular part 10-2 of the clutch drum 10 forms holes 45 for the CVT oil, which is re-circulated inside the space of the clutch drum 10 in a conventional manner. Above mentioned liquid tight structure of the piston 12 can also assure a liquid tightness of the hydraulic chamber with respect to the CVT oil (clutch oil).

Figure 2:
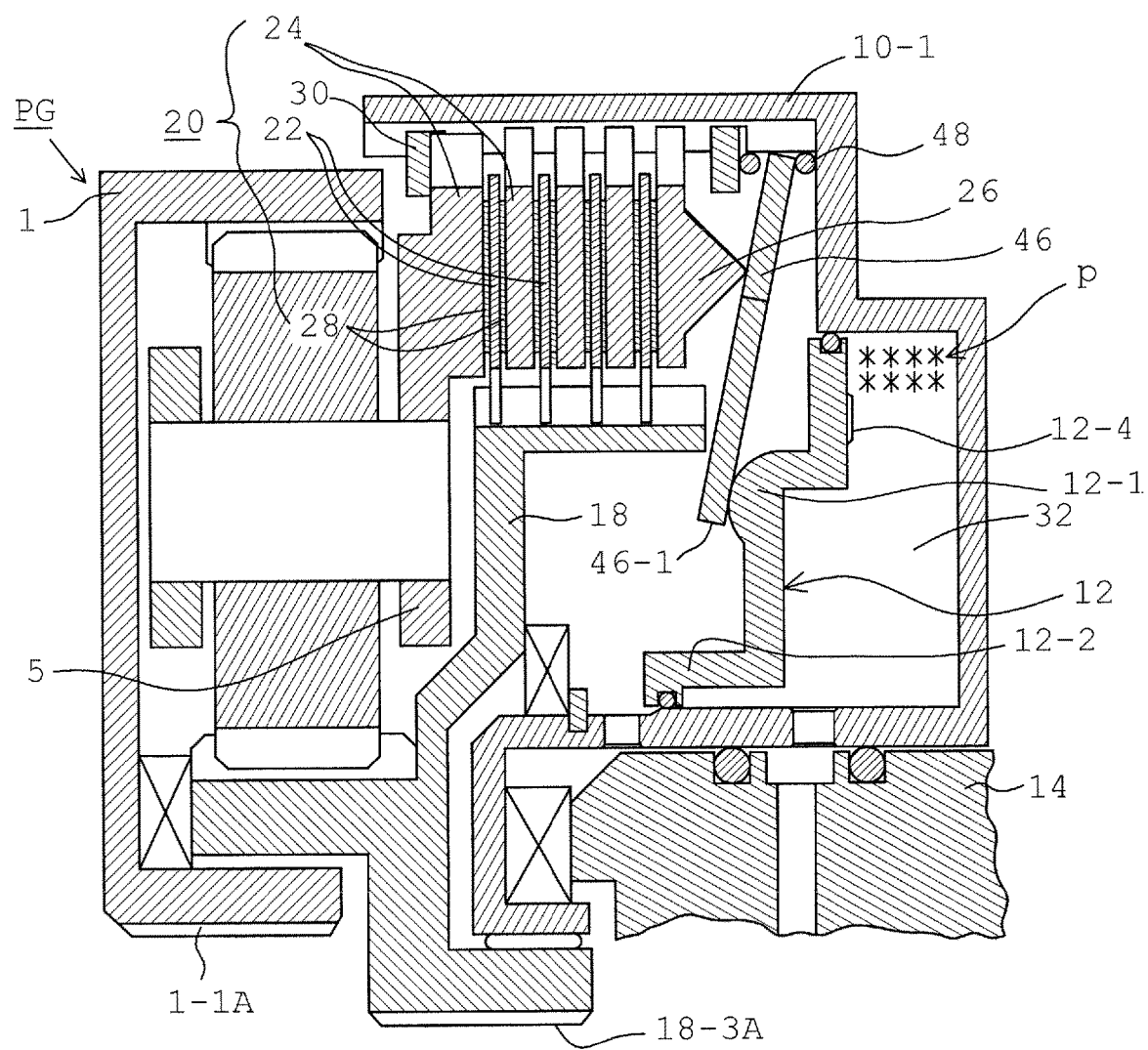
FIG. 2 is the same as FIG. 1 except that the clutch is under an engaged condition.
Figure 3:
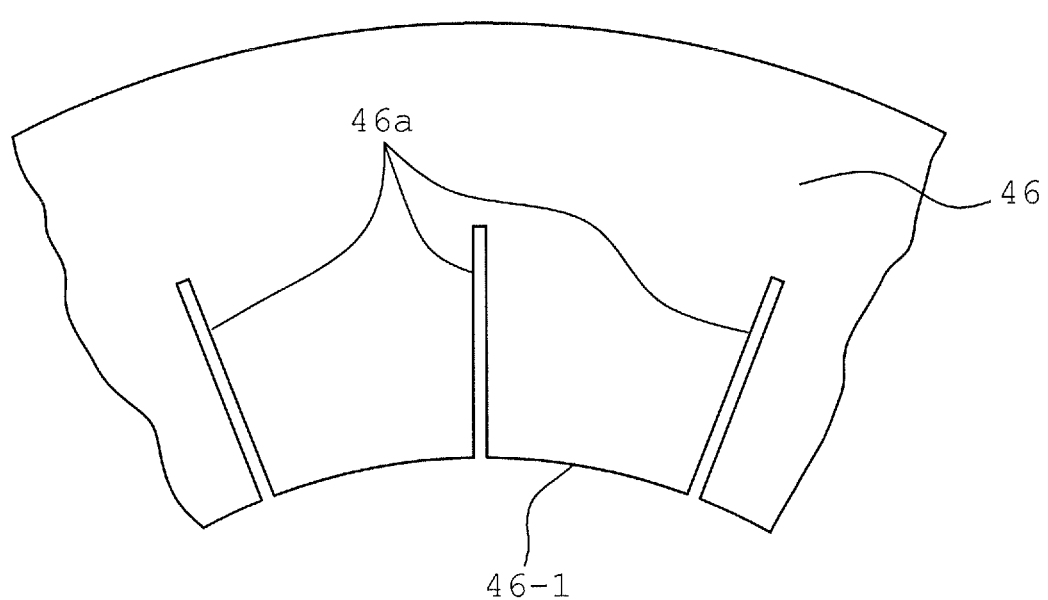
FIG. 3 shows a partial front view of a disk spring in the wet-type multi plate clutch in the first embodiment, which is taken along a line III in FIG. 1.

The disk spring 46 is made from a thin steel plate of a high tenacity such as spring steel and forms an annular shape and forms, generally, a truncated cone shape of thin depth having a central part directed to the piston. FIG. 3 is a partial front elevational view of the disk spring 46. The disk spring 46 has a radially outer peripheral edge located closely adjacent and faced with the inner peripheral surface of the outer tubular part 10-1 of the clutch drum 10. The disk spring 46 has a central opening 46-1, the inner peripheral edge of which opening is arranged around the central tubular part 12-2 of the piston 12, which is arranged on the inner tubular part 10-2 of the clutch drum 10 in a manner that a slide movement of the piston 12 with respect to the clutch drum 10 is obtained. Thanks to the inverse L like cross sectional shape of the piston 12 in the embodiment of the present invention, an arrangement is obtained that the disk spring 46 extends, across an axial extended line 12a of the outer periphery of the piston 12a, to the disk spring presser part 12-1 located at a position around the radially central position of the front wall 12-3 of the piston 12, resulting in that the disk spring 46 makes a contact with the disk spring presser part 12-1 located at the central part of the front surface of the piston without intervening the axial movement of the piston 12. This arrangement is advantageous in that a value of effective radial length of the disk spring 46 as long as possible is obtained in the limited inner space of the clutch drum 10. The disk spring 46 is arranged inside the clutch drum 10 at a side of the piston 12 away from the hydraulic chamber. In this embodiment of the invention, steel rings 48 are arranged adjacent the respective sides of the outer peripheral part of the disk spring 46. One of the steel rings 48 is located to face the inner surface of the sidewall part 10-4 of the clutch drum 10. The other or opposite steel ring 48 is arranged to face a stopper ring 50, which is, at its outer peripheral part, engaged with and fixed to the clutch drum 10. The arrangement of the steel rings 48 (disk spring support parts of the invention) located adjacent the respective outer surfaces of the outer peripheral part of the disk spring 46 allows the outer peripheral part to be slightly axially moved. This arrangement of the steel rings 48 can however provide a support point for the disk spring 46 to cause the disk spring to function as a spring force booster under a leverage action, as will fully described later. Furthermore, the disk spring 46 has an inner opening 46-1 and makes a contact with the disk spring presser part 12-1 of the piston 12 at a location adjacent the opening 46-1. As a result, the forward movement of the piston 12 causes the spring presser part 12-1 to press the inner peripheral part of the disk spring 46, so that the disk spring 46 is subjected to an elastic deformation. A continuation of the forward movement of piston 12 causes the disk spring 46 to make a contact, at its radial intermediate portion, with the pressure receive part 26. A resultant axial movement of the pressure receive part 26 finally causes the clutch pack 20 to assume an engagement condition of the clutch pack 20 as shown in FIG. 2. Thanks to the arrangement of the disk spring 46 that is, at its outer peripheral part, located at a position adjacent the inner periphery of the outer peripheral part 10-1 of the clutch drum as well as the arrangement that, from this position, the pressure receive part 26 and the spring pressing part 12-1 of the piston 12 are arranged along a radially inward direction of the disk spring 46, i.e., along the direction in the length in the cross sectional view of the disk spring 46 in FIG. 1, the maximum effective radial length of the disk spring 46 in the limited radial space inside the clutch drum 10 is obtained, which makes it possible to eliminate a necessity of a canceller chamber which, otherwise, has been considered as an essential element in a conventional structure of rotating piston type clutch.

The reverse movement clutch CL2 is not shown in detail. The reverse movement clutch CL2 in the vehicle provided with the continuous variable transmission is kept under non-engaged condition during a substantial time of duration of movement of a vehicle. Therefore, a consideration in a reduction of fuel consumption efficiency as the object of the present invention is not largely necessitated unlike the forward movement clutch CL1 where the latter is usually under the engaged condition. In view of this, the reverse movement clutch CL2 may be of a conventional structure where coil springs are used for the retuning spring means, as shown in the Patent Document 5. In the reverse movement clutch CL2, a clutch pack is provided, which is, in its driving side, arranged between the outer tubular part 10-1 of the clutch drum 10 of the forward movement clutch CL1 and the transmission casing TC. A non-engaged condition of the reverse movement clutch CL2 allows the clutch drum 10 of the forward movement clutch CL1 to rotate freely with respect to the transmission case TC. Contrary to this, an engaged condition of the reverse movement clutch CL2 causes the clutch drum 10 of the forward movement clutch CL1 to be connected to the transmission case TC, so that the clutch drum 10 is subjected to be a braking operation, i.e., clutch drum 10 is connected integrally to the transmission case TC.

Now, an operation of the forward-reverse switching device as the embodiment of the present invention will be explained. In the forward movement of the vehicle, the forward clutch CL1 is engaged and the reverse clutch CL2 is disengaged. In an operation of the forward clutch CL1 as shown in FIG. 1, when the hydraulic chamber is de-pressurized, the disk spring 46 is slightly and resiliently deformed from a truncated conical shape at a non-loaded state so as to assume a set condition, where the outer peripheral part of the disk spring 46 contacts, at the side surface facing the clutch pack, with the steel ring 48 adjacent the stopper ring 50. The inner peripheral part of the disk spring 46 contacts, at the opposite side surface in the inner peripheral part, with the presser part 12-1 of the piston 12. Under a resilient force as generated at the set condition of the disk spring 46, the piston 12 contacts, at its engaging part 12-4, with the faced surface of the clutch drum 10, so that a retracted position of the piston 12 during the non-engaged condition of the clutch is obtained. Namely, in the retracted position, the disk spring 46 faces, at its middle location, with the presser part 12-1 of the piston and the piston 12 contacts, at its engaging part 12-4, with the opposed inner surface of the clutch drum 10. In the set condition of the disk spring 46, the pressure receive part 26 of the clutch pack 20 faces with the disk spring 46 at a small gap or play. Furthermore, due to existence of small clearances between the clutch facings 22 fixed to the surfaces of the drive plates 22 and the driven plates 24, the clutch pack 20 is under the non-engaged condition where no power transmission occurs between the drive plates 22 and the driven plates 24. Finally, the small gap or play existing between the disk spring 46 and the pressure receive part 26 in the non-engaged condition is illustrated in FIG. 1.

In order to make the clutch to be engaged, the hydraulic oil is introduced into the hydraulic chamber via the passageway 38 and the annular groove 40 in the clutch drum support body 14. A resultant increase in the hydraulic pressure in the hydraulic chamber cause the piston 12 to be forwardly moved, so that the presser part 12-1 at first contact with the central part of the disk spring 46. A resultant axial pressing force by the piston 12 causes the disk spring 46 to be displaced in a manner that the disk spring 46 is made to be contact with the pressure receive part 26 and that the outer peripheral part of the disk spring 46 to be contact with the steel ring 48 (the disk spring support part) adjacent the side wall part 10-4 of the clutch drum 10. Such change in the contact point of the outer part of the disk spring 46 from the steel ring 48 adjacent the stopper ring 50 to the steel ring 48 adjacent the clutch drum causes the truncated conical shape to be gradually axially reversed in accordance with the continuation of the forward movement of the piston on one hand and, on the other hand, the gaps to be removed, which otherwise exist between the clutch facing 28 on the dive plates 22 and the opposed driven plates 24 during the non-engaged condition of the clutch pack 20. As a result, a fully engaged state of the clutch pack 20 is obtained, where the drive plates 22 and the driven plates located adjacent with each other in the clutch pack 20 are engaged with each other. After the engaged condition of the clutch pack 20 as thus obtained, the forward movement of the piston continues for a short while for further deformation of the disk spring 46 due to the depression by the presser part 12-1. The forward movement of the piston ceases, when a fully stroked of the piston 12 as shown in FIG. 2 is obtained. In this embodiment, the outer peripheral part of the disk spring 46 is slightly moved between the position contacting the steel ring 48 adjacent the member to the stopper ring 50 to the steel ring 48 adjacent the portion 10-1. This movement is however very small due to a small value of distance between the steel rings 48. Therefore, it is able to state that the casing 10 substantially non-movably supports the disk spring 46 during the forward movement of the piston 12 for obtaining the engaged condition of the clutch.

In an engaged condition of the clutch, in the planetary gear device PG, the carrier 5 integral with the driven plate 24 most remote form the piston 12 in the clutch pack 20 and the sun gear 2 integral with the hub 18 in the forward clutch CL1 are united with each other so that the carrier 5 and the sun gear 2 rotated at the same speed together with the ring gear 1 of the planetary gear device PG. As a result, one-to-one rotation movement transmission of a rotating movement is obtained from an output shaft (not shown) of the engine (not shown) in a spline engagement with the toothed portions 18-3A of the clutch hub 18 to an input shaft (not shown) of the continuous variable transmission (not shown) under the spline engagement with the toothed portions 1-1A of the ring gear 1.

Figure 4:
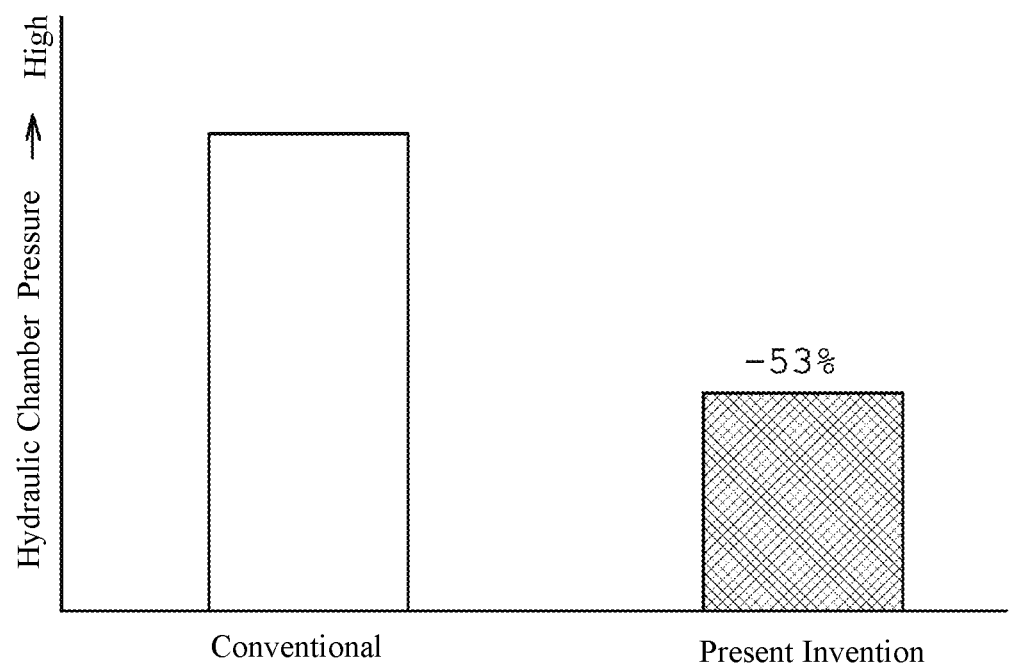
FIG. 4 is a bar chart illustrating values of hydraulic pressure when the wet-type multi plate clutch provided with the disk spring as return spring means in a forward-reverse mechanism in a vehicle equipped with a continuous variable transmission according to the present invention, in comparison with a prior art wet-type multi plate clutch where coil springs as return spring means are used.

In the first embodiment of the invention, when the piston 12 is forwardly moved from the clutch non-engaged condition in FIG. 1 for moving the pressure receive part 26 via the disk spring 46 in order to make the clutch pack 20 to engage, the outer peripheral part of the disk spring 46 is fixedly held by means of the steel rings 48 (disk spring support part), whereat a fulcrum point is created for a transmission of the axial pressing force of the piston 12 as generated by the hydraulic pressure in the hydraulic chamber to the clutch pack 20 via the pressure receiving pat 26, which pressing force is multiplied under a leverage action. In the cross section shown in FIG. 1, the disk spring 46 is considered as a lever, of which fulcrum is the point of a contact of the outer peripheral part of the spring 46 with the steel ring 48 and a lever ratio is expressed by a/b, where a is the length from the fulcrum to the contact point of the spring 46 with the piston 12 and b is the length of the spring 46 from the fulcrum to the pressure receiving pat of the clutch pack 20. This means that the pressure transmitted to the pressure receive part 26 of the clutch pack 20 is boosted for the value of the lever ratio a/b with respect to the pressure force generated in the piston 12 under the hydraulic pressure in the hydraulic chamber. This means that a desired engaged condition of the clutch pack 20 is obtained even when the pressure at the hydraulic chamber is reduced for a value corresponding to the increased pressure by the lever action. Tests were done by the inventors for two different constructions of forward clutches for a drive train using the continuous variable transmission (CVT), wherein the first one is of a conventional type that uses coil springs as the return spring means and the other one is of the first embodiment of the present invention that uses the disk spring 46 as the return spring means. In the tests, measurements were done as to values of hydraulic pressure leading to the respective clutch engaged conditions. The obtained result is schematically illustrated in FIG. 4 as bar charts, which shows that 53% reduction of hydraulic pressure is obtained in the embodiment of the present invention over the prior art. Thanks to the reduction in the hydraulic pressure, a corresponding decrease in power consumption by the hydraulic oil pump, i.e., an increase in fuel consumption efficiency is obtained. In the forward-reverse switching mechanism in the drive train using the continuous variable transmission, the forward clutch is under the engaged condition during almost all of the operating time of the vehicle and, therefore, an employment of the wet-type multi plate clutch in the embodiment of the invention makes it possible to obtain a significant increase in the fuel consumption efficiency.

In order to return to the clutch non-engaged condition in FIG. 1 from the clutch engaged condition in FIG. 2, the hydraulic pressure in the hydraulic chamber is removed. Namely, the elastic energy as stored in the disk spring 46 as the deformed condition in FIG. 2 is applied to the piston 12, so that the piston 12 is moved back to the position as shown in FIG. 1. A construction in the invention is realized, that the outer peripheral part of the disk spring 46 faces the outer tubular part 10-1 of the clutch drum 10, that the inner peripheral part faces the tubular part 12-2 of the piston 12 and that the contact points of the disk spring 46 with the steel ring 48 (the spring contact point), with the pressure receive part 26 and with the pressing part 12-1 of the piston 12 are arranged along the disk spring 46 in the cross section thereof as shown in FIG. 1. Furthermore, in the embodiment, the disk spring 46 extends radially inwardly, across the longitudinal extension line 12a of the outer surface of the piston 12, toward the spring presser part 12-1 located radially inward of the extension line 12a. This structure realizes the maximum value of an effective length of the disk spring 46 between the contact point with the steel ring 48 and the contact point with the piston 12 in the limited radial space inside the clutch drum 10, which results in a maximized value of the elastic energy accumulated in the disk spring 46 at the maximum stroke position in FIG. 2, which causes the disk spring 46 to positively return to the initial position in FIG. 1. This fact is advantageous in that a canceller chamber can be eliminated, which otherwise has been considered essential in a conventional type of the wet-type multi plate clutch.

A necessity of a provision of the canceller chamber essential in the conventional wet-type multi plate clutch will now be discussed for the purpose of a comparison with the present invention, while being referred to FIG. 2. When the hydraulic chamber 32 is de-pressurized for obtaining the reverse movement of the piston from the position shown in FIG. 2, some amount of the hydraulic oil remains in the hydraulic chamber 32. The hydraulic oil remaining in the hydraulic chamber 32 is subjected to a centrifugal force due to the rotating movement of the piston 12. The centrifugal force causes the hydraulic pressure oil remaining in the hydraulic chamber to be radially outwardly moved, so that a concentration of the remaining oil is generated at the outer peripheral part P of the hydraulic chamber as shown by asterisks in FIG. 2. Under the rotating movement, the hydraulic oil remaining in the hydraulic chamber 32 generates hydraulic pressure (centrifugal oil pressure) opposing to the return movement of the piston 12, which may prevent the piston 12 from effecting a smooth return movement and may generate non-controllable slippage between the clutch plates 24 and the clutch facings 28 in the clutch pack 20, which would result in an occurrence of premature damage by excessively generated heat of the clutch. To combat this problem, a provision of a canceller chamber was made in the prior art at a side of the piston 12 away from the hydraulic chamber, i.e., at location inside the clutch for arranging return springs (coil springs). Such a canceller chamber is able to store some amount of the CVT oil (clutch oil) effective to generate centrifugal pressure for crossing out the centrifugal pressure in the hydraulic chamber. In short, the provision of the canceller chamber in the prior art is effective of obtaining a positive return movement of the piston.

The present invention can eliminate a necessity of any provision of such canceller chamber in the prior art by a special arrangement of the disk spring 46. Namely, in the leveraged structure of the present invention, the disk spring 46 can have a possible maximized radial length, as discussed above, resulting in an increased returning force as stored in the disk spring 46, which allows the piston 12 to be returned to the initial position against the centrifugal force in the hydraulic chamber. Due to the elimination of the canceller chamber, a simplified structure is realized on one hand and, on the other hand, a reduction in a total number of parts is realized. The Patent Document 3 discloses a construction where non-rotating pistons and a disk spring as return spring means are provided and the force of the non-rotating pistons as boosted by a lever ratio is transmitted to a clutch pack. The idea for boosting the spring force in the Patent Document 3 is partially similar to the present invention. However, the key idea of the present invention is not in mere boosting of the spring force as is the case in the Patent Document 3 but in the special idea largely different therefrom that, along the radial length of the disk spring 46, the fulcrum point (48) at the inner periphery of the clutch drum 10, the contact point with the pressure receive part 26 at the middle part of the spring 46 and the inner contact point with the spring presser part 12-1 of the piston 12 are arranged, resulting in the maximum effective length of the disk spring 46 in the limited radial space inside the clutch drum 10. The structure of the present invention allows a canceller chamber to be eliminated, which otherwise essentially would be needed at the side of the piston opposite the operating chamber in the conventional structure of the wet-type multi plate clutch of the rotating piston type on one hand and, on the other hand, allows a fuel consumption efficiency to be highly improved.

AS shown in FIG. 3, the disk spring 46 is formed with circumferentially spaced and radially extending cutout portions 46a along the inner periphery thereof, each of the cutout portions forms a slit like shape. The cutout portions 46a along the inner periphery functions to decrease desirably the elastic modulus of the disk spring 46 at the locations where the spring makes contacts with the piston 12. As result, an optimization becomes to be possible so long as the returning force of the disk spring 46 applied to the piston is concerned. Furthermore, between the forward movement and the reverse movement of the piston 12, axially oppositely directed displacements (deformations) of the disk spring 46 at its central portion are to be occurred and the cutout portions 46a at the inner periphery of the disk spring 46 assists that the above-mentioned deformations to be smoothly occurred.

When the vehicle effects a reverse movement, the forward clutch CL1 is disengaged and the reverse clutch CL2 is engaged. By the engagement of the reverse clutch CL2, the clutch drum 10 and the carrier 5 of the planetary gear device PG integrated to the clutch drum 10 are stopped under a braking operation, so that a rotating movement of the clutch hub 18 connected to the engine is transmitted via the ring gear 1 under gear ratio between the ring gear 1 and the sun gear 2. As described previously, the reverse clutch CL2 is formulated as a usual wet-type multi plate clutch, which employs coil springs as return spring means.

Figure 5:
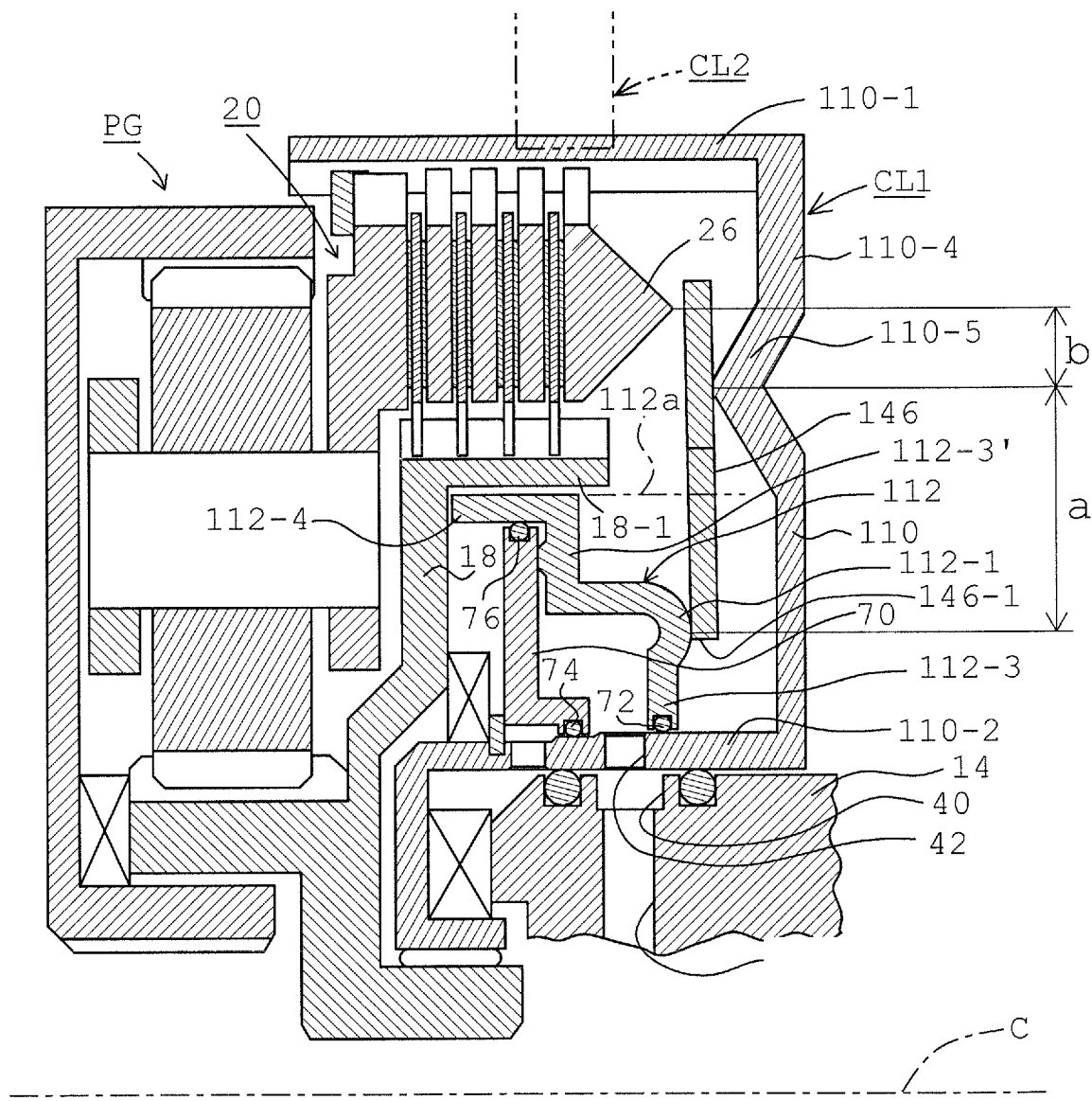
FIG. 5 is a cross sectional view of a wet-type multi plate clutch in a second embodiment of the present invention when the clutch is under a disengaged condition, the clutch being shown at a side thereof along the central axis.

FIG. 5 illustrates a second embodiment of the invention, where a clutch (forward clutch) CL1 including a clutch drum, a piston and a disk spring as returning means are of different constructions from those in the first embodiment but remaining constructions are unchanged. The following explanation will be basically focused to the different structures. The clutch drum 110 in the second embodiment does not have a part like the axially extended part 10-5 in the first embodiment and has a correspondingly reduced axial length. The piston 112 in this embodiment is located substantially totally inside the outer tubular part 18-1 of the clutch hub 18 in order to allow the piston 112 to be stored in the clutch drum 110 of the reduced axial length. The piston 112 has a front wall part 112-3 of a step like cross sectional shape, which font wall part is, at its lower or inner end, axially slidable with respect to the inner tubular part 110-2 of the clutch drum 110. Furthermore, thanks to the step like cross sectional shape, the piston 112 forms an axially rearwardly displaced front wall part 112-3', from which an outer cylindrical part 112-4 extends. In addition, an annular support plate 70 is additionally provided for supporting the piston 112. The front side of the piston 112 is, at the lower step shaped part, a presser part 112-1 for the disk spring 146. A hydraulic chamber 132 is formed between the piston 112 and the annular support plate 70, to which hydraulic chamber the annular groove 40 is opened byway of the feed holes 42 for the hydraulic oil. As a result, not only an introduction of the hydraulic oil into the hydraulic chamber 132 from the oil pump via the hydraulic passageway 38 and the annular groove 40 but also the discharge of the hydraulic oil from the operating chamber 132 become possible. Finally, seal rings 72, 74 and 76 are provided at parts of the piston 112 as well as the annular supporting plate 70 whereat sliding movements of the piston 112 and the annular supporting plate 70 occur for obtaining an oil sealed structure of the hydraulic chamber 132.

Now, a construction of the disk spring 146 as the returning spring means in the second embodiment of the invention will be explained. As similar to the first embodiment, the disk spring 146 forms, at its central part, an opened part 146-1 and a shallow truncated conical shape directed so as to be spaced from the side wall part 110-4 of the clutch drum 110 in a set condition shown in FIG. 1. Furthermore, the disk spring 146 has an outer peripheral part faced with an outer tubular pat 110-1 of the clutch drum 110 and has an inner peripheral part faced with an inner tubular part 110-2 of the clutch drum 110. Thanks to the stepped cross-sectional shape of the font part of the piston 112 in the second embodiment of the present invention, a structure is realized that the disk spring 146 radially inwardly extends across an extension line 112a of the outer peripheral surface of the piston toward the spring presser part 112-1 located at the location adjacent the central part of the inner front side wall part 112-3 of the piston 112. In other words, a structure is realized that the disk spring 146 extends inwardly so as to be able to contact with the presser part 112-1 at the central part of the front surface of the piston without any possibility of interference with the piston 112. Thanks to this structure, a length of the disk spring 146 as long as possible can be obtained in the limited space inside the clutch drum 110, which allows to store a large elastic energy in the disk spring 146 as return spring means, resulting in a positive return movement of the piston 112 under a return spring force as generated by the disk spring 146. Namely, the clutch drum 110 forms, at its side wall part 110-4, a circular part 110-5 (spring support part of the invention) of an angled cross-sectional shape projected inwardly of the clutch drum, which circular part functions as a fulcrum for the disk spring 146 when a boost of the spring force is taken under a leverage action. The disk spring 146 opposes, at its outer peripheral side, the pressure receive part 26 of the clutch pack 20 at a small gap (play) and contacts, at its inner peripheral side, with the spring presser part 112-1 as an annular projection of a rounded cross-sectional shape at the front surface of the piston 112. In addition, the annular part 110-5 of an angled cross-sectional shape of the crutch drum 110 contacts, at its radial middle part, with the disk spring 146. Astride the disk spring 146, the contact point of the pressure receive part 26 with the disk spring 146 and the contact point of the annular part 110-5 of the angled cross-sectional shape face with a contact point of the annular part 110-5 of the angled cross-sectional shape with respect to the disk spring 146 functioning as a fulcrum point for boosting the force under the lever action. At a set condition of the disk spring 146 as shown in FIG. 5, the disk spring 146 makes contact points at its opposed sides, i.e., a contact point with the spring presser part 112-1 at the inner periphery of the spring 146 and a contact point with the annular part 110-5 (disk spring support part of the invention) in a manner that a preset spring force is generated where the disk spring 146 is slightly deformed from a free state of the spring for generating a set force, which allows the disk spring 146 to be held in a position coaxial with the center of the rotation C as shown in FIG. 5. Furthermore, at the position as shown in FIG. 5, the pressure receive part 26 is spaced from the disk spring 146 as a small gap (play) for obtaining the non-engaged condition of the clutch pack 20.

An introduction of the hydraulic oil under a high pressure into the operating chamber 132 causes the piston 112 to be moved in an axial direction spaced from the support plate 70, so that the inner peripheral part of the disk spring 146 is subjected to a pressing by the spring presser part 112-1 as an annular projected part at a leading end of the piston 112. As a result, the disk spring 146 is, in the cross-sectional view of FIG. 5, rotated in counter clockwise direction about the projected end of the angled cross sectional shaped annular part 110-5 as a fulcrum point on one hand and, on the other hand, the truncated conical shape of the disk spring 146 is deepened. This causes the outer peripheral part of the disk spring 146 to be contacted with the pressure receive part 26 of the clutch pack. The continued forward movement of the piston 112 causes the clutch pack 20 to assume the engaged condition by the pressure receive part 26. In this embodiment, the contact point of the angled cross-sectional shape part 110-5 with the disk spring 146 functions as a fulcrum point so that the force applied to the piston 112 by the oil pressure in the operating chamber 146 is boosted at a lever ratio, which is the radio of the radial length b from the contact point of the disk spring 146 to the radial length a from the contact point of the disk spring 146 to, i.e., b/a.

Figure 6:
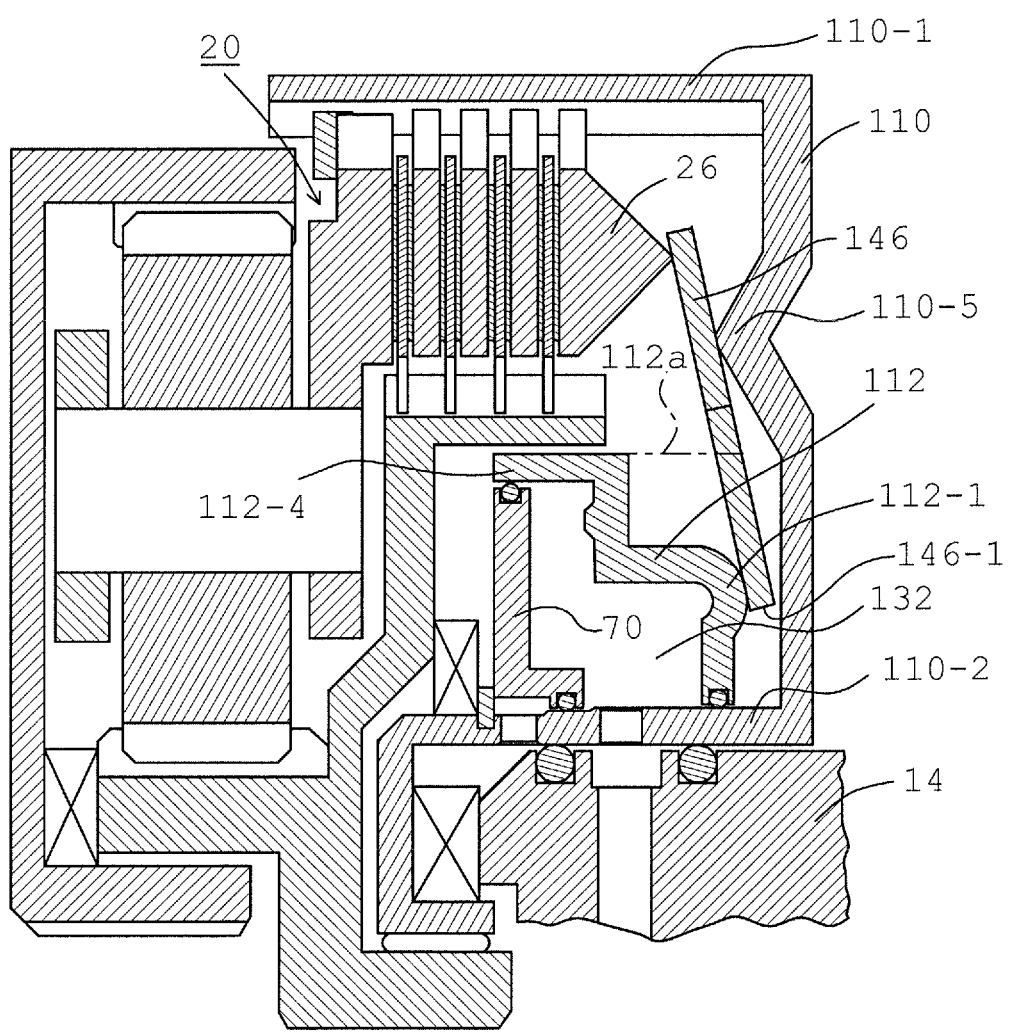
FIG. 6 is the same as FIG. 5 except that the clutch is under an engaged condition.

FIG. 6 illustrates the maximum stoke condition where the piston 112 effects some forward movement from the engaged condition of the clutch pack 20 as shown in FIG. 5. In this embodiment, an arrangement is obtained that the disk spring 146 faces, at its outer peripheral part, the outer tubular part 110-1 of the clutch drum 110 and faces, at its outer peripheral part, the inner peripheral part 110-2 of the clutch drum 110 and that, along the radial direction of the disk spring 146, the contact point with the pressure receive part 26, the angled cross-sectional shaped annular part 110-5 as the spring presser part and the contact point with the piston 112. Thanks to this arrangement, an advantage as obtained also in the first embodiment is obtained that the maximum effective length of the disk spring 146 from the contact point with the pressure receiving pat 26 to the contact point with the piston 112 for the creation of the spring force as stored is obtained within the restriction of the arrangement of the disk spring 146 within the limited radial space of the inside of the clutch drum 110. As a result, without provision of any canceller chamber at the side of the piston 112 remote from the hydraulic chamber 132 as similar to the first embodiment of the invention, a return movement of the piston 112 to the initial position as shown in FIG. 5 can be reliably obtained by positively overcoming the centrifugal force as may be generated in the hydraulic chamber 132. As similar to the first embodiment of the invention, the disk spring 146 may be formed with slits like those 46a in FIG. 3, resulting in an optimization of the return force as generated by the disk spring 146 as well as a smooth deformation of the central part of the disk spring 146 in accordance with the forward and/or reverse movement of the piston.

EXPLANATION OF REFERENCE NUMERALS 10, 110: Clutch drum (Outer rotating member of the invention)
   10-1, 110-1: Outer tubular part of clutch drum
   10-2, 110-1: Inner tubular part of clutch drum
   10-4: Side wall part of clutch drum
   110-5: Annular angled cross-sectional of clutch drum (Spring support part of the invention)
12, 112: Piston
   12-1, 112-1: Spring presser part of piston
   12-3, 112-3: Font wall part of piston
14: Support body of clutch drum (Support body of the invention)
18: Clutch hub
20: Clutch pack
22: Drive plate (Second clutch plate of the invention)
24: Driven plate (First clutch plate of the invention)
26: Pressure receive part (Pressure receive member of the invention)
28: Clutch facing
30: Annular stopper (Positioning member for clutch pack of the invention)
32, 132: Hydraulic chamber
38: Hydraulic Passageway
42: Oil supply port
45; Port for CVT oil
46, 146: Disk spring
   46a: Cutout of disk spring
48: Steel ring (Spring support part of the invention)
a, b: Lever length
CL1: Forward clutch
CL2: Reverse clutch
PG: Planetary gear unit
TC: Transmission case

The invention claimed is:
1. A wet-type multi plated clutch comprising:
a support body defining therein a hydraulic passageway;
an outer rotating member having an outer tubular part, an inner tubular part and a side wall part, from which the side wall part, the outer tubular part, and the inner tubular part extend axially, the outer rotating member forming therein a space for storing clutch oil, said inner tubular part being rotatable with respect to the support body;

an inner rotating member arranged rotatably inside of and coaxially with the outer rotating member;

a clutch pack having a plurality of first clutch plates fixed in rotation and axially slidable with respect to the outer rotating member, a plurality of second clutch plates fixed in rotation and axially slidable with respect to the inner rotating member, the first and second clutch plates being axially alternately arranged and clutch facings, each of which is fixed to one of axially opposed surfaces of the first and second clutch plates, which are axially located adjacent with each other, said clutch pack being capable of selectively switched between an engaged condition where a power transmission occurs between the first and the second clutch plates via the clutch facings when being pressed from axially opposed sides and a disengaged condition where the power transmission between the first and the second clutch plates does not occur when not being pressed from the axially opposed sides;

a clutch pack positioning member arranged in the outer tubular part of the outer rotating member, the clutch pack positioning member defining a position of the clutch pack on one side thereof in the axial direction;

a pressure receiving member arranged on the side of the clutch pack opposite the clutch pack positioning member;

a piston arranged inside the outer rotating member coaxial therewith, the piston being moved between a reverse position and a forward position;

a hydraulic chamber formed on one side of the piston in a manner such that a liquid tight condition with respect to clutch oil is obtained, a supply of clutch oil into the hydraulic chamber via the hydraulic passageway causing the piston to be forwardly moved, a removal of the clutch oil via the hydraulic passageway causing the piston to be reversely moved;

a disk spring formed as an annular resilient plate, which, in the radial direction, extends at its outer peripheral part toward the outer tubular part of the outer rotating member and extends at its inner peripheral part toward the inner tubular part of the outer rotating member and which, in the axial direction, faces at its inner peripheral side with the piston and faces at its outer peripheral side with the pressure receiving member, the disk spring having elasticity for urging the piston to move reversely when the pressure inside the hydraulic chamber is low so that the piston is spaced from the pressure receiving member causing the clutch pack to take the disengaged condition, the piston being moved in the forward direction against the force of the elasticity of the disk spring for pressing the clutch pack by the pressure receiving member to cause the clutch pack to take the engaged condition, and a disk spring support member for axially supporting non-movably or substantially non-movably the disk spring with respect to the outer rotating member at a predetermined radial location of the disk spring during the forward movement of the piston for obtaining the engaged condition of the clutch pack, a contact point of the disk spring with respect to the disk spring support member being determined with respect to a contact point of the disk spring with respect to the piston and a contact point of the disk spring with respect to the pressure receiving member in a manner such that the pressure force generated in the piston by the hydraulic pressure in the hydraulic chamber is transmitted to the pressure receiving member while being boosted under a leverage action, wherein the contact point of the disk spring with respect to the pressure receiving member and the contact point of the disk spring with respect to the piston are, via the disk spring, arranged axially opposite the disk spring support member, and the disk spring support member is constructed as an annular projection formed at the side wall part of the outer rotating member.

2. The wet-type multi plated clutch according to claim 1, wherein the piston is arranged radially inside of the inner rotating member, and an annular support member, which is at an outer peripheral part thereof slidable with respect to the piston, is arranged on the inner tubular part of the outer rotating member, the hydraulic chamber being formed by the piston and the annular support member.

3. The wet-type multi plated clutch according to claim 1, wherein the disk spring is, along the inner periphery, formed with portions of reduced value of elastic modulus for controlling a returning force of the disk spring.

4. The wet-type multi plated clutch according to claim 1, wherein the piston is of a shape that allows the disk spring to extend radially inwardly to the contact point of the piston with the disk spring across an axial extension line of the outermost surface of the piston.

5. The wet-type multi plated clutch according to claim 1, wherein an arrangement of the piston at a side surface thereof opposite the hydraulic chamber is such that the side surface does not affect formation of the space for storing therein the clutch oil in a liquid tight manner, which otherwise generates pressure for moving the piston in a direction toward the hydraulic chamber under a centrifugal force as generated in the clutch oil by rotation.

* * * * *